(12) United States Patent  
Momose et al.

(10) Patent No.: US 10,977,453 B2  
(45) Date of Patent: Apr. 13, 2021

(54) CARD READER AND FOREIGN MATTER DETECTION METHOD

(71) Applicant: NIDEC SANKYO CORPORATION, Nagano (JP)

(72) Inventors: Munemasa Momose, Nagano (JP); Yasuhiro Kitazawa, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 0 days.

(21) Appl. No.: 16/433,351

(22) Filed: Jun. 6, 2019

(65) Prior Publication Data

US 2019/0384946 A1 Dec. 19, 2019

(30) Foreign Application Priority Data

Jun. 18, 2018 (JP) .............................. JP2018-115615

(51) Int. Cl.
| | |
|---|---|
| *G06K 19/06* | (2006.01) |
| *G06K 7/10* | (2006.01) |
| *G06K 7/00* | (2006.01) |
| *G06K 13/08* | (2006.01) |

(52) U.S. Cl.
CPC ............. *G06K 7/10* (2013.01); *G06K 7/0008* (2013.01); *G06K 7/0091* (2013.01); *G06K 13/0806* (2013.01)

(58) Field of Classification Search
CPC ........... G06K 13/0806; G06K 13/0881; G06K 7/0008; G06K 7/0091; G06K 7/10
See application file for complete search history.

(56) References Cited

U.S. PATENT DOCUMENTS

| | | | | |
|---|---|---|---|---|
| 2004/0075730 A1* | 4/2004 | Tsuruta | .................... | B41J 2/325 347/171 |
| 2004/0177196 A1* | 9/2004 | Moon | ................... | G06F 9/4411 710/300 |
| 2004/0245336 A1* | 12/2004 | Miyazawa | ............. | G06K 13/08 235/439 |
| 2005/0062672 A1* | 3/2005 | Wakabayashi | ......... | H01Q 21/06 343/867 |
| 2005/0083395 A1* | 4/2005 | Kubota | .................. | B41J 13/025 347/215 |

(Continued)

FOREIGN PATENT DOCUMENTS

JP 2017174164 A 9/2017

*Primary Examiner* — Thien M Le  
(74) *Attorney, Agent, or Firm* — Cantor Colburn LLP

(57) ABSTRACT

A card reader may include a main body part having a conveyance path; a first card detection mechanism disposed upstream of the main body part; a second card detection mechanism disposed in the main body part at a distance less than a length of the card from the first card detection mechanism; a shutter member disposed between the first and second card detection mechanisms; a shutter state detector; and a control unit. The control unit may be structured to close the shutter member when an object is detected by the second card detection mechanism after being detected by the first card detection mechanism, and then the inserted object is not detected by the second card detection mechanism while the inserted object is not detected by the first card detection mechanism; and detect that an object other than the card has been inserted when the shutter member close after the control.

9 Claims, 15 Drawing Sheets

(56) References Cited

U.S. PATENT DOCUMENTS

| | | | |
|---|---|---|---|
| 2011/0050832 A1* | 3/2011 | Aihara | B41J 2/325 347/215 |
| 2016/0140366 A1* | 5/2016 | Tanaka | G06K 7/087 235/449 |
| 2019/0138761 A1* | 5/2019 | Akahane | G06K 13/0806 |

* cited by examiner

FIG. 6
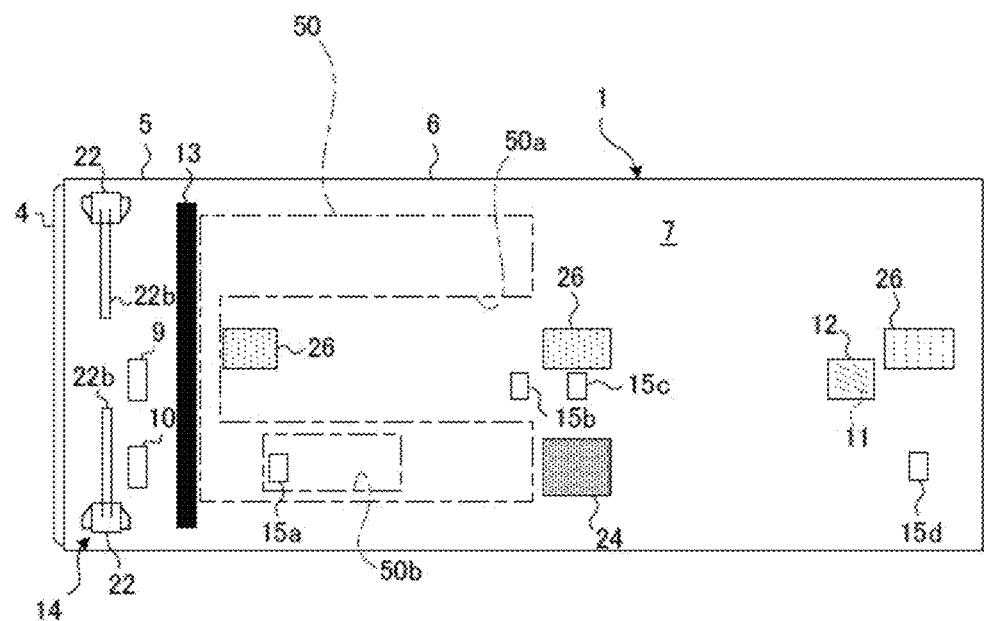
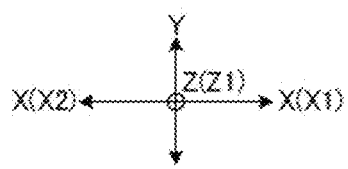

CARD READER AND FOREIGN MATTER DETECTION METHOD

CROSS REFERENCE TO RELATED APPLICATIONS

The present invention claims priority under 35 U.S.C. § 119 to Japanese Application No. 2018-115615 filed Jun. 18, 2018, the entire content of which is incorporated herein by reference.

FIELD OF THE INVENTION

At least an embodiment of the present invention relates to a card reader for reading data recorded on a card or recording data onto the card. Further, at least an embodiment of the present invention relates to a foreign matter detection method for such a card reader.

BACKGROUND

Card readers for reading magnetic data recorded on a card and recording magnetic data onto the card have been used widely. In industries such as financial institutions where card readers are used, so-called skimming in which the magnetic data of a card is illegally acquired using a magnetic head by a criminal attaching the magnetic head to a card insertion part of a card reader has become a large problem. The tricks used for skimming by criminals become more sophisticated year by year, and the situation in which a device for skimming such as a magnetic head for skimming (hereinafter, referred to as an "insert skimmer") for reading the magnetic data of the card is attached on the inside of a card reader has been occurring. JP-A-2017-174164 discloses a technique for detecting that an insert skimmer has been inserted on the inside of a card reader.

The technique for detecting the insertion of an insert skimmer is not limited to that disclosed in JP-A-2017-174164, and it is advantageous for the prevention of crime to be able to combine and carry out a plurality of techniques.

SUMMARY

At least an embodiment of the present invention, in consideration of the aforementioned situation, provides a card reader which can detect that a foreign matter such as an insert skimmer having a specific shape has been inserted on the inside of a card reader by a method which is different from that of JP-A-2017-174164 and a foreign matter detection method.

At least an embodiment of a card reader may include: a main body part including a card conveyance path in which a card inserted from an insertion port is conveyed;
  a first card detection mechanism disposed upstream of the main body part in an insertion direction of the card and structured to detect the card;
  a second card detection mechanism disposed in the main body part at a distance less than a length of the card in the insertion direction from the first card detection mechanism and structured to detect the card;
  a shutter member disposed between the first card detection mechanism and the second card detection mechanism and structured to move between a closed position to close the card conveyance path and an open position to open the card conveyance path;
  a shutter state detector structured to detect a state of the shutter member; and
  a control unit structured to:
    control to move the shutter member to the closed position when an object inserted from the insertion port is detected by the second card detection mechanism after the inserted object is detected by the first card detection mechanism, and then the inserted object is not detected by the second card detection mechanism at a timing when the inserted object is not detected by the first card detection mechanism; and
    detect that an object other than the card has been inserted when the shutter state detector detects that the shutter member does not move to the closed position after the control.

A foreign matter detection method for a card reader including a main body part including a card conveyance path in which a card inserted from an insertion port is conveyed, a first card detection mechanism disposed upstream of the main body part in an insertion direction of the card and structured to detect the card, a second card detection mechanism disposed in the main body part at a distance less than a length of the card in the insertion direction from the first card detection mechanism and structured to detect the card, and a shutter member disposed between the first card detection mechanism and the second card detection mechanism and structured to move between a closed position to close the card conveyance path and an open position to open the card conveyance path, may include
  controlling to move the shutter member to the closed position when an object inserted from the insertion port is detected by the second card detection mechanism after the inserted object is detected by the first card detection mechanism, and then the inserted object is not detected by the second card detection mechanism at a timing when the inserted object is not detected by the first card detection mechanism; and
  detecting that an object other than the card has been inserted when it is detected that the shutter member does not move to the closed position after the control.

At least an embodiment of the present invention can provide the card reader which can detect that a foreign matter such as an insert skimmer having a specific shape has been inserted on the inside of a card reader, and the foreign matter detection method.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is a plan view illustrating a state in which the insert skimmer 50 shown in FIG. 5A is inserted in a main body part 6 of the card reader 1;

DETAILED DESCRIPTION (Configuration of Card Reader)

Figure 1:
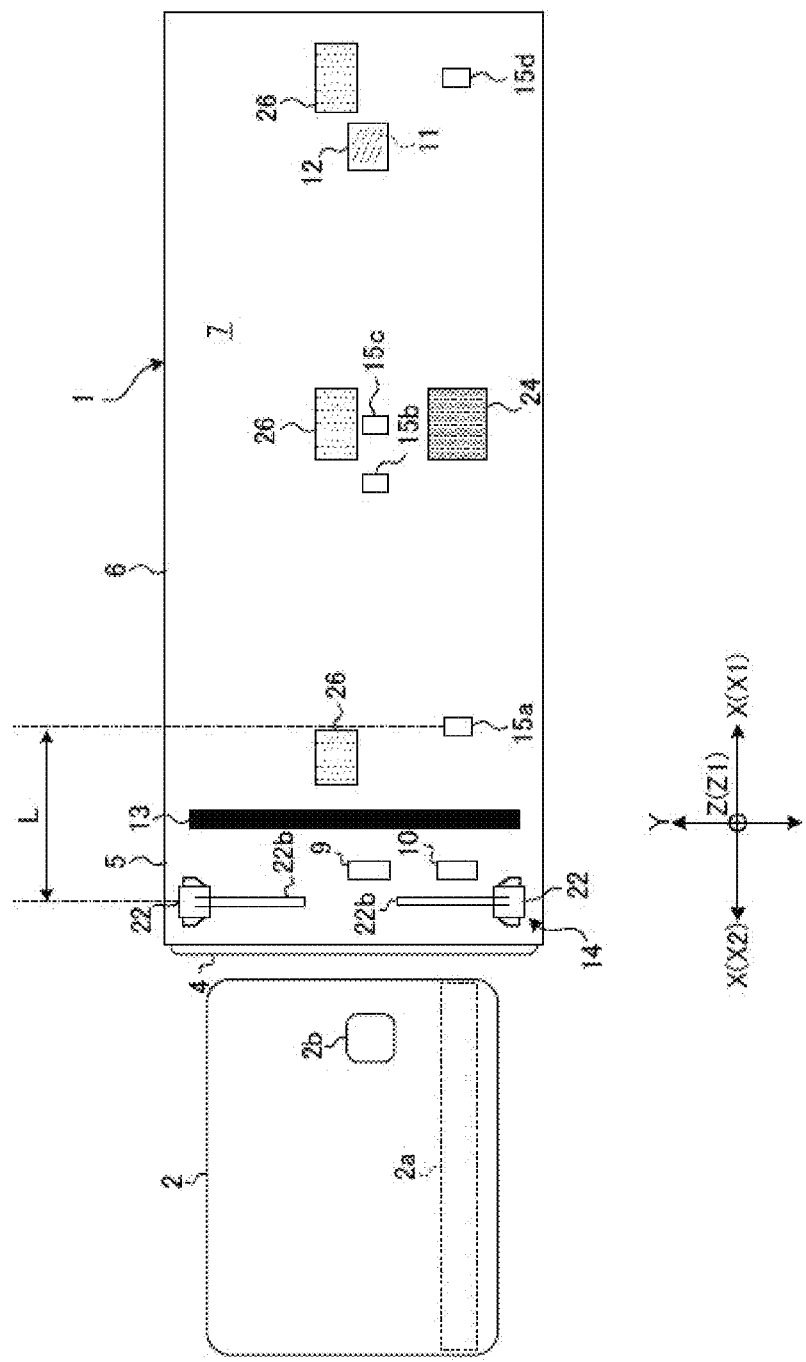
FIG. 1 is a plan view describing the configuration of a card reader 1 according to an embodiment of the card reader of the present invention.
Figure 2:
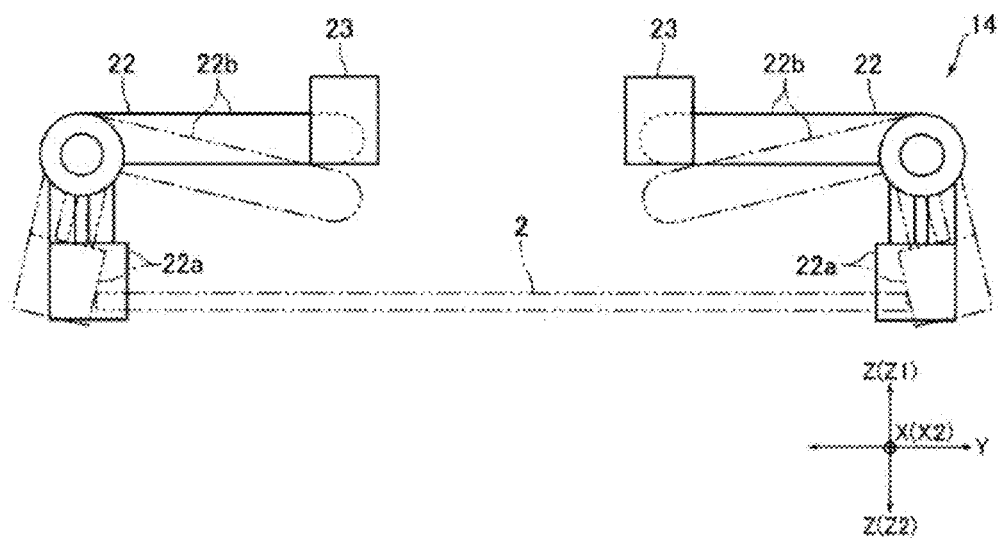
FIG. 2 is a front view describing the configuration of a card insertion detection mechanism 14 shown in FIG. 1.
Figure 3:
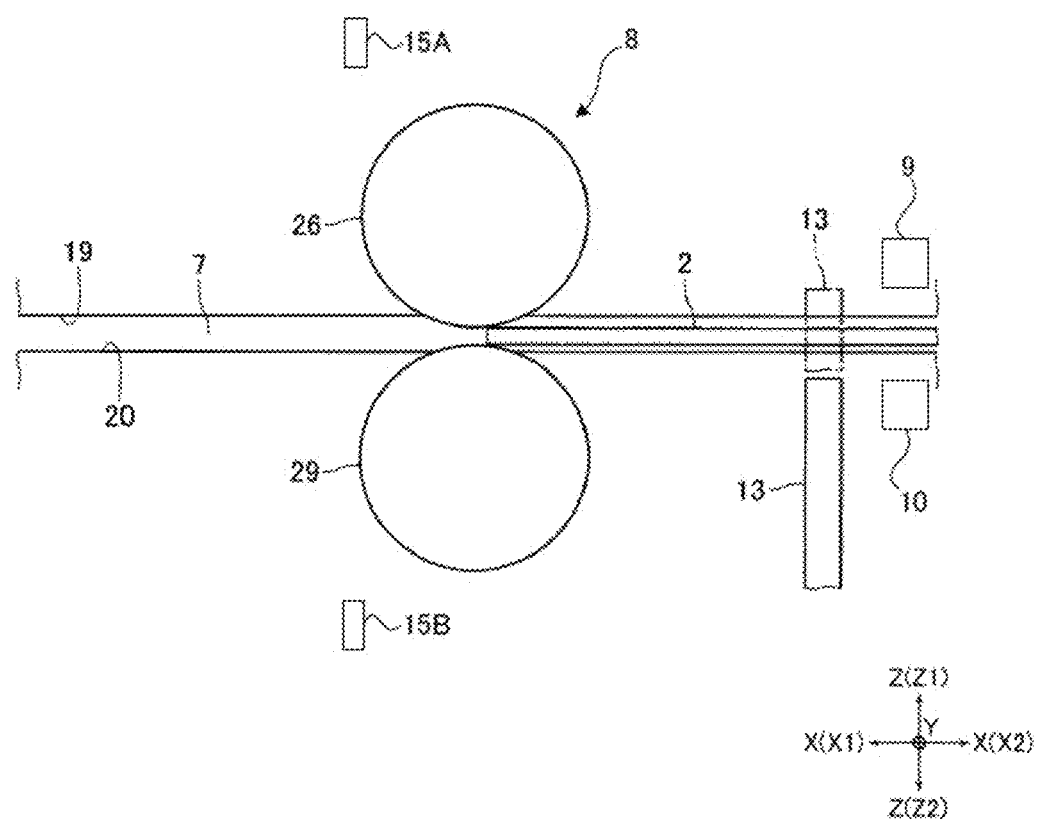
FIG. 3 is a side view for describing the configuration of a prehead 10, an IC chip sensor 9, a card detection mechanism 15a and a conveyance roller 26 shown in FIG. 1.
Figure 4:
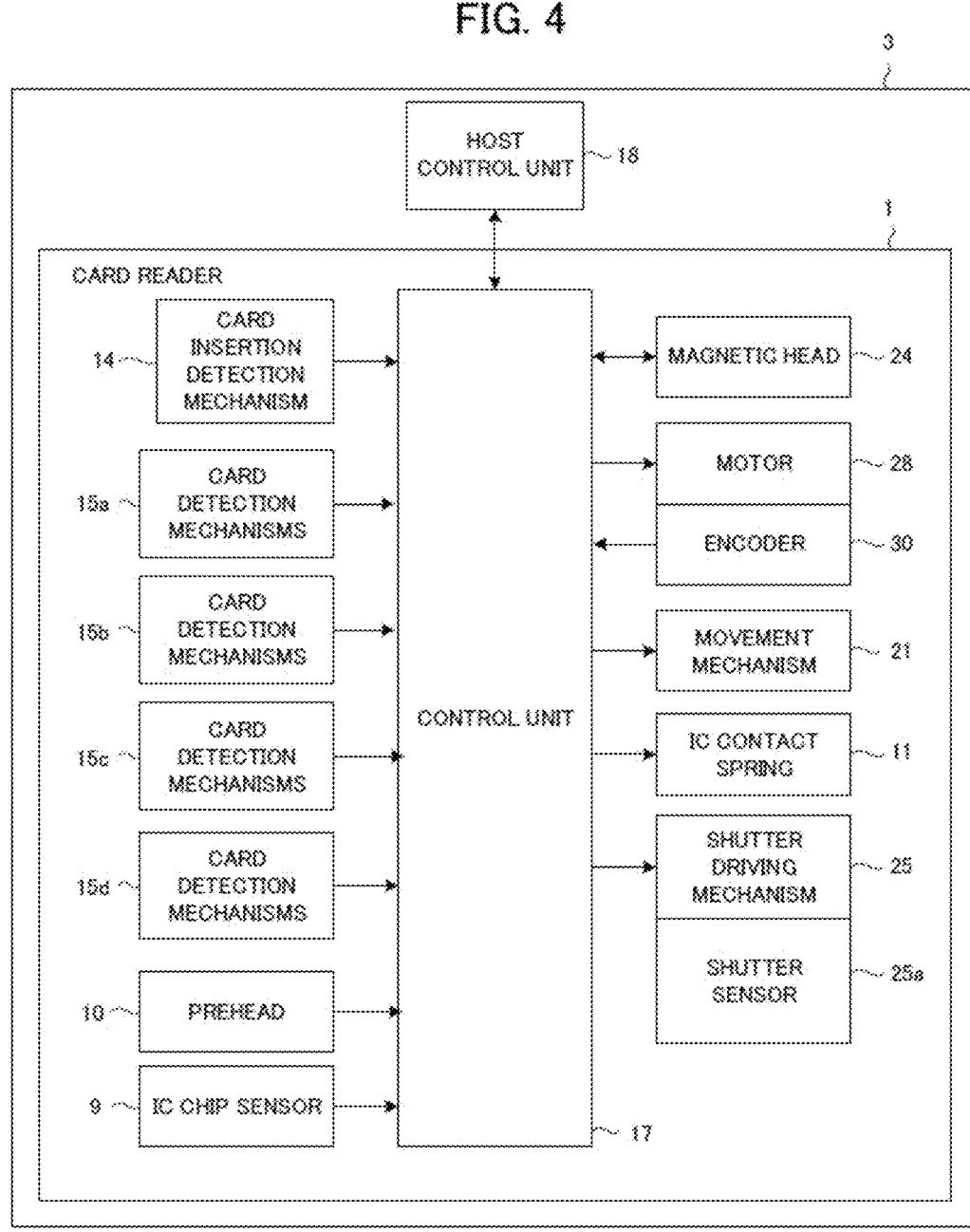
FIG. 4 is a block diagram of a host device 3 on which the card reader 1 shown in FIG. 1 is mounted and the card reader 1.

FIG. 1 is a plan view describing the configuration of a card reader 1 according to an embodiment of the card reader of the present invention. FIG. 2 is a front view describing the configuration of a card insertion detection mechanism 14 shown in FIG. 1. FIG. 3 is a side view describing the configuration of the prehead 10, the IC chip sensor 9, the card detection mechanism 15a and the conveyance roller 26 shown in FIG. 1. FIG. 4 is a block diagram of a host device 3 on which the card reader 1 shown in FIG. 1 is mounted and the card reader 1.

The card reader 1 is a device for reading data recorded on a card 2 and recording data into the card 2, and is used by mounting on a host device 3 (refer to FIG. 4) such as an Automated Teller Machine (ATM). As shown in FIG. 1, the card reader 1 includes a card insertion unit 5 in which an insertion port 4 for inserting a card 2 is formed, and a main body part 6. A card conveyance path 7 in which the card 2 which is inserted into the insertion port 4 is conveyed is formed on the inside of the main body part 6 of the card reader 1, and the card reader 1 includes a card conveyance mechanism 8 (Refer to FIG. 3) which conveys the card 2 on the card conveyance path 7.

The card reader 1 conveys the card 2 in the X direction shown in FIG. 1 and the like. Further, the card 2 is inserted in the X1 direction and ejected in the X2 direction of FIG. 1 and the like. Namely, the X1 direction is the insertion direction of the card 2 into the insertion port 4, and the X2 direction is the ejection direction of the card 2 from the injection port 4. Further, the Z direction in FIG. 1 and the like, which is orthogonal to the X direction is the thickness direction of the card 2 inserted in the insertion port 4, and the Y direction in FIG. 1 and the like, which is orthogonal to the X direction and the Z direction is the width direction of the card 2. In the following description, the X direction is the front and rear direction, the Y direction is the right and left direction, and the Z direction is the vertical direction. Further, the side (X2 direction side) on which the insertion port 4 is formed in the front and rear direction is a "front" side, and the opposite side (X1 direction side) is a "rear (back)" side. Further, one side (Z1 direction side) in the vertical direction is an "upper" side, and the opposite side (Z2 direction side) is a "lower" side.

The card 2 is, for example, a rectangular-shaped card made of vinyl chloride and having a thickness in the range of 0.7 mm to 0.8 mm. Further, the card 2 is a contact type IC card with a magnetic stripe as prescribed by International Standard (ISO/IEC7811) or Japanese Industrial Standards JIS (JISX6302). As shown in FIG. 1, a magnetic stripe in which magnetic data is to be recorded is formed on the back face (bottom surface) of the card 2. Further, an IC chip may be incorporated in the card 2, and an external connection terminal 2b of the IC chip is formed on the front side (upper side) of the card 2. The magnetic stripe 2a and the external connection terminal 2b are formed in a predetermined position prescribed by the international standards or JIS standards.

The card reader 1 comprises a magnetic head 24 for performing at least one of reading magnetic data recorded on a magnetic stripe 2a or recording magnetic data onto the magnetic stripe 2a (refer to FIG. 1), and an IC contact block 12 having a plurality of IC contact springs 11 in contact with the external connection terminal 2b of the card 2 on the inside of the main body part 6.

Further, the card reader 1 comprises a shutter member 13 for closing the card conveyance path 7, a card insertion detection mechanism 14 for detecting that a card 2 has been inserted in the insertion port 4, a prehead 10, an IC chip sensor 9, card detection mechanisms 15a, 15b, 15c and 15d for detecting the presence of a card 2 in the card conveyance path 7 and a control unit 17 for controlling the card reader 1. The control unit 17 is connected to a host control unit 18 which is the control unit of the host device 3 (refer to FIG. 4).

The card insertion unit 5 is connected to the front end of the main body part 6. The card conveyance path 7, as shown in FIG. 3, includes an upper guide member 19 constituting the upper surface of the card conveyance path 7 and a lower guide member 20 constituting the lower surface of the card conveyance path 7. The upper guide member 19 and the lower guide member 20 are made of an insulating resin material. As shown in FIG. 1, the magnetic head 24 and the IC contact block 12 are disposed on the inside of the main body part 6. The magnetic head 24 is disposed so that a gap part of the magnetic head 24 faces the card conveyance path 7 from the lower side. The IC contact block 12 is disposed on the rear side relative to the magnetic head 24. Further, the IC contact block 12 is disposed so as to face the card conveyance path 7 from the upper side. The magnetic head 24 is electrically connected to the control unit 17 (refer to FIG. 4). Note that, the IC contact block 12 may be configured to be disposed in front of the magnetic head 24 (for example, between the second conveyance roller 26 and the first conveyance roller 26 counting from the side closer to shutter member 13).

The movement mechanism 21 (refer to FIG. 4) which moves the IC contact block 12 between a contactable position in which the IC contact spring 11 can be in contact with the external connection terminal 2b of the card 2 and a retreated position retreated (specifically, retreating to the upper side) so that the IC contact spring 11 is not in contact with the external connection terminal 2b of the card 2 is connected to the IC contact block 12. The movement mechanism 21 includes a drive source such as a solenoid, and a power transmission mechanism such as a link mechanism for transmitting the power of the drive source to the IC contact block 12. The movement mechanism 21 is connected to the control unit 17. Specifically, the drive source of the movement mechanism 21 is electrically connected to the control unit 17. The IC contact spring 11 is electrically connected to the control unit 17. The control unit 17 supplies current to the IC contact spring 11. Examples of the movement mechanism 21 include the configuration described in WO 2018/61685, the configuration described in WO 2016/158946, or the configuration which moves using a cam groove.

The card insertion detection mechanism 14 is disposed on the rear side of the insertion port 4, and detects the card 2 inserted in the insertion port 4. The card insertion detection mechanism 14 is a first card detection mechanism for detecting that the card 2 is inserted into the insertion port 4 by detecting the width (width in the right and left direction) of the card 2 inserted in the insertion port 4. As shown in FIG. 2, this card insertion detection mechanism 14 includes two lever members 22 respectively disposed on both sides in the right and left direction and two sensors 23. The card insertion detection mechanism 14 is disposed in a front end side portion of the card insertion unit 5. Further, the card insertion detection mechanism 14 is electrically connected to the control unit 17. Specifically, the two sensors 23 are electrically connected to the control unit 17. The sensor 23 is a transmission type optical sensor having a light emitting element and a light receiving element disposed so as to face each other. The sensor 23 is disposed on the upper side of the card conveyance path 7 so that the light emitting unit and the light receiving unit face each other in the front and rear direction. Note that, in FIG. 1, the illustration of the sensors 23 has been omitted.

The lever member 22 is formed so that the shape as viewed from the front and rear direction is substantially L-shaped, and is constituted from card contact parts 22a respectively disposed on both end sides of the card conveyance path 7 in the right and left direction, and a light intercepting parts 22b extending from the upper end of the card contact part 22a to the inside in the right and left direction. This lever member 22 is rotatably held by a frame of the card insertion unit 5, so as to make it possible to have a center of rotation at the boundary between the card contact part 22a and the light intercepting parts 22b and rotation in the front and rear direction as the axis of rotation. The light intercepting parts 22b are disposed on the upper side of the card conveyance path 7. Further, the lever member 22 is biased by a spring member which is not shown so that the lower end side of the card contact part 22a is disposed in the card conveyance path 7.

During the standby mode prior to the card 2 being inserted into the insertion port 4, as shown by the solid line of FIG. 2, the lower end side of the card contact part 22a is disposed in the card conveyance path 7, and the two respective light intercepting parts 22b intercept between the light emitting unit of sensor 23 and the light receiving unit. At this time, the card insertion detection mechanism 14 is in an OFF state. In this state, when the card 2 in which the width of the short-side direction is a predetermined width is inserted in the insertion port 4, as shown by the two-dot chain line of FIG. 2, both the left and right ends of the card 2 contact with the lower end side of the two respective card contact parts 22a to rotate the two lever members 22 until the two respective light intercepting parts 22b are separated from the light emitting unit of the sensor 23 and the light receiving unit. If the two respective light intercepting parts 22b are separated from the light emitting unit of the two sensors 23 and the light receiving unit, the card insertion detection mechanism 14 is in the ON state.

On the one hand, the width of the card 2 inserted in the insertion port 4 is narrower than the predetermined width, thus, when the light intercepting parts 22b are not separated from between the light emitting unit of sensor 23 of at least one of the two sensors 23 and the light receiving unit, the card insertion detection mechanism 14 remains in the OFF state. Therefore, the card insertion detection mechanism 14 detects a card 2 by switching from an OFF state to an ON state when the width in the right and left direction of the card 2 inserted in the insertion port 4 is a predetermined width. Note that, during the standby mode prior to the card 2 being inserted into the insertion port 4, by separating the two respective light intercepting parts 22b between the light emitting unit of the sensor 23 and the light receiving unit, the card insertion detection mechanism 14 may be in an OFF state. In this case, when a card 2 having a predetermined width is inserted in the insertion port 4, and the space between the light emitting unit of the sensor 23 and the light receiving unit is intercepted by the two respective light intercepting parts 22b, the card insertion detection mechanism 14 is in the ON state. The configuration of the card insertion detection mechanism 14 is not limited to that shown in FIG. 2. For example, the card contact part 22a may be disposed to only one side in the width direction of the card, and the other side may be a side surface of the conveyance path of the card. In this case, by setting the distance between the card contact part 22a and the side surface of the conveyance path of the card to a predetermined width (slightly narrower than the width of the card), the insertion will be detected when the card is inserted.

The shutter member 13 is disposed in the boundary portion between the card insertion unit 5 and the main body part 6, in other words, the rear end side of the card insertion unit 5. The shutter driving mechanism 25 (refer to FIG. 4) is connected to the shutter member 13. The shutter driving mechanism 25 includes a drive source such as a solenoid, and a power transmission mechanism such as a link mechanism for transmitting the power of the drive source to the shutter member 13.

The shutter driving mechanism 25 is connected to the control unit 17. Specifically, the drive source of the shutter driving mechanism 25 is electrically connected to the control unit 17.

The shutter member 13 can move between a closed position (position illustrated by the two-dot chain line of FIG. 3) which closes the card conveyance path 7 and an open position (position illustrated by the solid line of FIG. 3) which retreats from the card conveyance path 7 to open the card conveyance path 7. A shutter sensor 25a as a shutter state detector to detect a state of the shutter member 13 is disposed in the vicinity of the shutter member 13 (refer to FIG. 4).

The shutter sensor 25a comprises, for example, a switch to turn on (or off) when the shutter member 13 stays at the closed position and to turn off (or on) when the shutter member 13 stays at the open position, and a contact sensor to contact the shutter member 13 and to output a contact detection signal when the shutter member 13 stays at the closed position or not to contact the shutter member 13 and not to output a contact detection signal when the shutter member 13 stays at the open position. The shutter sensor 25a outputs a closed state signal to the control unit 17 when the shutter member 13 stays at the closed position, and outputs a non-closed state signal to the control unit 17 when the shutter member 13 stays at the open position.

The prehead 10 is a magnetic head for detecting whether or not the desired magnetic data determined in accordance with the standards has been recorded on the magnetic stripe 2a of the card 2 inserted from the insertion port 4. The prehead 10 is disposed between the card insertion detection mechanism 14 and the shutter member 13 in the card insertion unit 5, and detects magnetism from the position where the magnetic stripe 2a of the card 2 inserted in the insertion port 4 is to be formed. The prehead 10 functions as a magnetic detector. The prehead 10 is disposed in the right and left direction in almost the same position as the magnetic head 24 in the main body part 6. As shown in FIG. 3, the prehead 10 is disposed so that the gap part of the prehead 10 faces to the card 2 inserted in the insertion port 4 from the lower side.

The IC chip sensor 9 is a sensor for detecting whether or not an IC chip has been mounted on the card 2 inserted from the insertion port 4. Specifically, the IC chip sensor 9 is a metal sensor for detecting the metal contained on the external connection terminal 2b of the card 2 inserted from the insertion port 4. The IC chip sensor 9 is disposed in the card insertion unit 5 between the card insertion detection mechanism 14 and the shutter member 13, and detects the metal from the position where the external connection terminal 2b of the card 2 inserted in the insertion port 4 is to be formed. The IC chip sensor 9 functions as a metal detector.

The IC chip sensor 9 is in the same position in the front and rear direction as the prehead 10, and is disposed in the right and left direction in almost the same position as the IC contact block 12 in the main body part 6. As shown in FIG. 3, the IC chip sensor 9 is disposed so as to face the card 2 inserted in the insertion port 4 from the upper side.

The card detection mechanisms 15a, 15b, 15c and 15d are disposed on the inside of the main body part 6. Namely, the card detection mechanisms 15a, 15b, 15c and 15d are disposed on the rear side relative to the card insertion detection mechanism 14, the prehead 10 and the IC chip sensor 9. Further, the card detection mechanisms 15a, 15b, 15c and 15d are respectively disposed in a state shifted in the front and rear direction. The card detection mechanism 15b is disposed on the rear side relative to the card detection mechanism 15a, the card detection mechanism 15c is disposed on the rear side relative to the card detection mechanism 15b, and the card detection mechanism 15d is disposed on the rear side relative to the card detection mechanism 15c. The card detection mechanism 15a closest to the front side among the card detection mechanisms 15a, 15b, 15c, and 15d constitutes the second card detection mechanism. As shown in FIG. 1, the distance L in the front and rear direction between the card insertion detection mechanism 14 and the card detection mechanism 15a is less than a length of a legitimate card which the card reader 1 can read in the front and rear direction. As shown in FIG. 4, the card detection mechanisms 15a, 15b, 15c and 15d are electrically connected to the control unit 17. Further, as shown in FIG. 3, the card detection mechanisms 15a, 15b, 15c and 15d are transmission type optical sensors each having a light emitting unit 15A and a light receiving unit 15B disposed facing each other. Note that, in FIG. 3, an illustration of the card detection mechanisms 15b, 15c and 15d has been omitted. As shown in FIG. 3, the light emitting unit 15A and the light receiving unit 15B are disposed in a state in which the card conveyance path 7 is sandwiched in the vertical direction.

When there is no card 2 between the light emitting unit 15A and the light receiving unit 15B, the light receiving unit 15B receives light from the light emitting unit 15A. At this time, the card detection mechanisms 15a, 15b, 15c and 15d are in an OFF state. In this state, if a card 2 enters between the light emitting unit 15A and the light receiving unit 15B, the light from the light emitting unit 15A to the light receiving unit 15B is intercepted so that the card detection mechanisms 15a, 15b, 15c and 15d are in the ON state. Therefore, the card detection mechanisms 15a, 15b, 15c and 15d can detect a card 2 by switching from an OFF state to an ON state.

Note that, the card detection mechanisms 15a, 15b, 15c and 15d may be reflection type optical sensors. In this case, when the light receiving unit does not receive light from the light emitting units of the card detection mechanisms 15a, 15b, 15c and 15d, the card detection mechanisms 15a, 15b, 15c and 15d are in the OFF state, thus, if the light receiving unit receives light emitted from the light emitting units of the card detection mechanisms 15a, 15b, 15c and 15d and reflected from the card 2, the card detection mechanisms 15a, 15b, 15c and 15d are in the ON state.

As shown in FIG. 3, the card conveyance mechanism 8 includes three conveyance rollers 26 (refer to FIG. 1. In FIG. 3, only the most front side of the rollers is illustrated) in contact with the card 2 to convey the card 2 on the card conveyance path 7, a motor 28 (refer to FIG. 4) for driving each conveyance roller 26, and a power transmission mechanism (not shown) for transmitting the power of the motor 28 to each conveyance roller. Each conveyance roller 26 is disposed on the inside of the main body part 6. Namely, the conveyance rollers 26 are disposed to the rear side relative to the card insertion detection mechanism 14.

As shown in FIG. 3, a pad roller 29 is disposed to oppose each conveyance roller 26.

Each conveyance roller 26 and the pad roller 29 are opposed in the vertical direction. Further, the pad roller 29 is biased toward the conveyance roller 26, and the card 2 is conveyed in a state sandwiched between the conveyance roller 26 and the pad roller 29.

An encoder 30 for detecting the rotation of the motor 28 is attached to the motor 28 (refer to FIG. 4). In the present embodiment, it is possible to make the conveyance roller 26 rotate even in a state when the motor 28 is stopped, and if the conveyance roller 26 is rotated in the state when the motor 28 is stopped, the rotation of the motor 28 is detected by the encoder 30. Namely, if the conveyance roller 26 rotates in the state in which the motor 28 is stopped, the rotation of the conveyance roller 26 is detected by the encoder 30. The motor 28 and the encoder 30 are electrically connected to the control unit 17.

Configuration Example of Assumed Insert Skimmer

Figure 5A:
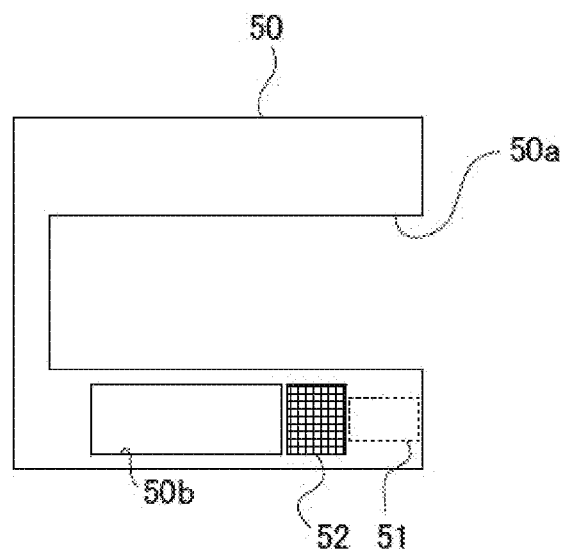
FIG. 5A is a diagram illustrating a first configuration example of an insert skimmer assumed to be inserted on the inside of the card reader, and 5B is a diagram illustrating a second configuration example of the insert skimmer assumed to be inserted on the inside of the card reader 1.
Figure 5B:
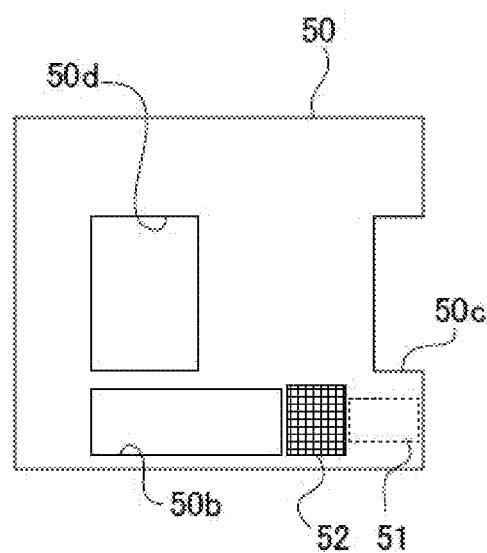

FIG. 5A is a diagram illustrating a first configuration example of the insert skimmer assumed to be inserted on the inside of the card reader 1. FIG. 5B is a diagram illustrating a second configuration example of the insert skimmer assumed to be inserted on the inside of the card reader 1. FIG. 6 is a plan view illustrating a state in which the insert skimmer 50 shown in FIG. 5A is inserted in the main body part 6 of the card reader 1.

The insert skimmer 50 shown in FIG. 5A and FIG. 5B includes a main body part formed by a rectangular plate-shaped electrically-conductive material in which the width in the right and left direction is substantially the same as the width of the card 2. Specifically, the main body part of the insert skimmer 50 is made of metal. A cutout part 50*a* or an aperture 50*d* for avoiding contacting with the conveyance roller 26 which is closest to the front side in the main body part 6 of the card reader 1 is formed in the main body part 6 of the insert skimmer 50 shown in FIG. 5A and FIG. 5B. Further, a through hole 50*b* is formed in the main body part of the insert skimmer 50 shown in FIG. 5A and FIG. 5B so as to not block light from the light emitting unit 15A of the card detection mechanism 15*a* toward the light receiving unit 15B when the insert skimmer 50 is attached to the main body part 6 of the card reader 1. Further, the cutout part 50*c* is formed in the main body part of the insert skimmer 50 shown in FIG. 5B so as to not block the light from the light emitting unit 15A of the card detection mechanism 15*b* toward the light receiving unit 15B when the insert skimmer 50 is attached to the main body part 6 of the card reader 1. The insert skimmer 50 shown in FIG. 5A is inserted in the main body part 6 by pushing manually because the cutout part 50*a* is large and the area of the main body part which can contact with the conveyance roller 26 is small. Because the insert skimmer 50 shown in FIG. 5B has a large area of the main body part which can contact with the conveyance roller 26, it is inserted in the main body part 6 by conveying with the conveyance roller 26 when the insert skimmer 50 is inserted into the insertion port 4.

A counterfeit magnetic stripe 51 is formed in the end part (tip end) of the rear side in the front and rear direction of the main body part of the insert skimmer 50 shown in FIGS. 5A and 5B, and the magnetic head 52 for reading the magnetic information from the magnetic stripe of the legitimate card 2 is formed to the left of this magnetic stripe 51. The information recorded on the magnetic stripe 51 is the same as the information recorded on the tip end of the magnetic stripe 2*a* of the legitimate card 2. The through hole 50*b* and the magnetic head 52 must be formed in the same position as the magnetic stripe 51 in the right and left direction in the main body part of the insert skimmer 50, thus, the length in the front and rear direction of the magnetic stripe 51 becomes sufficiently smaller than the length in the front and rear direction of the magnetic stripe 2*a* of the legitimate card 2. Note that, it is assumed that the position of the magnetic head 52 is, for example, on the left side of the through hole 50*b*. Further, it is assumed that the width in the front and rear direction of the through hole 50*b* is somewhat large somewhat large in order to definitely avoid the card detection mechanism 15*a*.

The control unit 17 of the card reader 1 shown in FIG. 4 performs overall control of the entirety of the card reader 1, and specifically, contains various processors which execute programs and perform processes, a Random Access Memory (RAM), and a Read Only Memory (ROM). The various processors include a central processing unit (CPU) which is a general-purpose processor functioning as various processing units by executing a program, a programmable logic device (PLD) which is a processor capable of changing a circuit configuration after a field-programmable gate array (FPGA) is manufactured, and a dedicated electric circuit which is a processor having a dedicated circuit configuration designed for performing a specific process such as an Application-Specific Integrated Circuit (ASIC). More specifically, the configuration of each of the various processors is an electrical circuit in which circuit elements, such as semiconductor elements, are combined. The control unit 17 may be configured by one of these various processors, or may be configured by a combination of two or more same or different processors (for example, a combination of a plurality of the FPGAs or the CPU and the FPGA).

The control unit 17 operates the prehead 10 and the IC chip sensor 9 when a card 2 is inserted in the insertion port 4 and the insertion of the card 2 is detected by the card insertion detection mechanism 14. Moreover, when the prehead 10 successfully reads the desired information from the tip end of the magnetic stripe 2*a* of the card 2, and the IC chip sensor 9 detects the IC chip, the control unit 17 moves the shutter member 13 from the closed position to the open position. Therefore, the card 2 can be incorporated into the main body part 6.

Further, the control unit 17 operates the prehead 10 and the IC chip sensor 9 when the insert skimmer 50 having the magnetic stripe 51 shown in FIG. 5A and FIG. 5B is inserted in the insertion port 4 and the insertion of the insert skimmer 50 is detected by the card insertion detection mechanism 14. Moreover, if the prehead 10 successfully reads the desired information from the magnetic stripe 51 of the insert skimmer 50 and the IC chip sensor 9 detected the metal of the main body part of the insert skimmer 50, the control unit 17 moves the shutter member 13 from the closed position to the open position.

Figure 7:
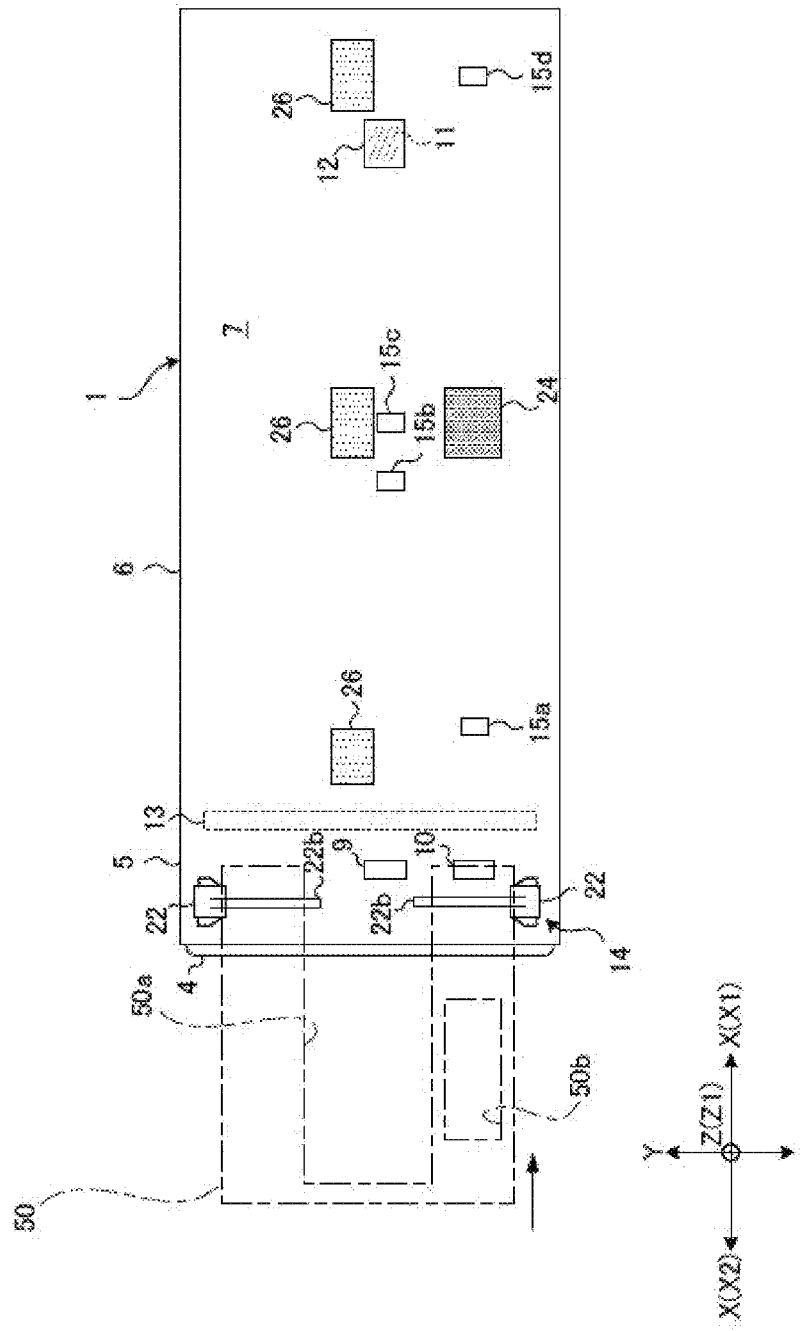
FIG. 7 is a diagram illustrating a state in which the insert skimmer 50 is inserted into an insertion port 4 and a shutter member 13 is open.

Therefore, as shown in FIG. 7, the insert skimmer 50 can be inserted on the inside of the main body part 6. In FIG. 7, the shutter member 13 is indicated by a broken line which indicates that it is in the open position.

The control unit 17 controls to move the shutter member 13 to the closed position when the card insertion detection mechanism 14 changes to an ON state, subsequently the card detection mechanism 15*a* changes to an OFF state, and the card detection mechanism 15*a* stays at an OFF state at the timing when the card insertion detection mechanism 14 changes to an OFF state. After this control, the control unit 17 detects an object other than the card 2 (for example, the insert skimmer 50) based on a signal the shutter sensor 25*a* outputs.

Figure 8:
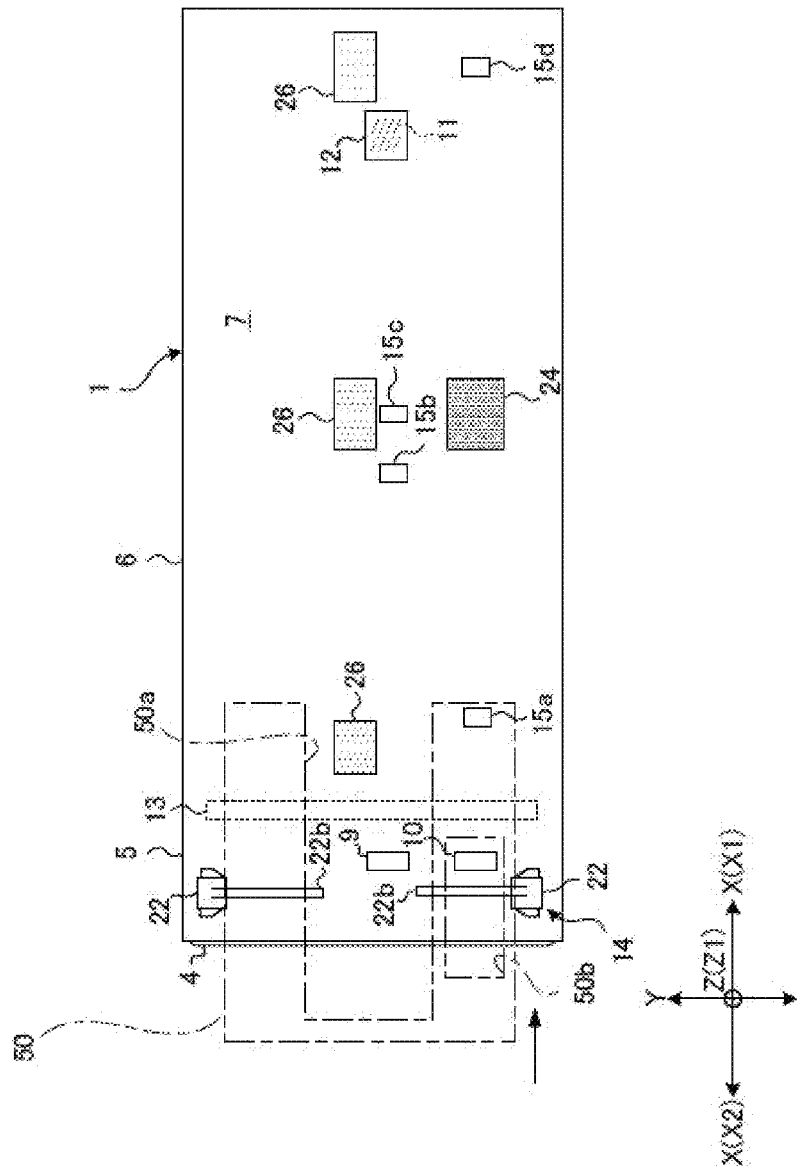
FIG. 8 is a diagram illustrating a state in which the insert skimmer 50 is further pushed to the rear side of the front and read direction from the state of FIG. 7.

When the inserted object is the insert skimmer 50, the insert skimmer 50 is pushed to the card conveyance path 7 from the state of FIG. 7 and the card detection mechanism 15*a* detects the insert skimmer 50 (refer to FIG. 8). Then, the insert skimmer 50 is further pushed to the rear side and the card insertion detection mechanism 14 changes from an ON state to an OFF state (refer FIG. 9).

Figure 9:
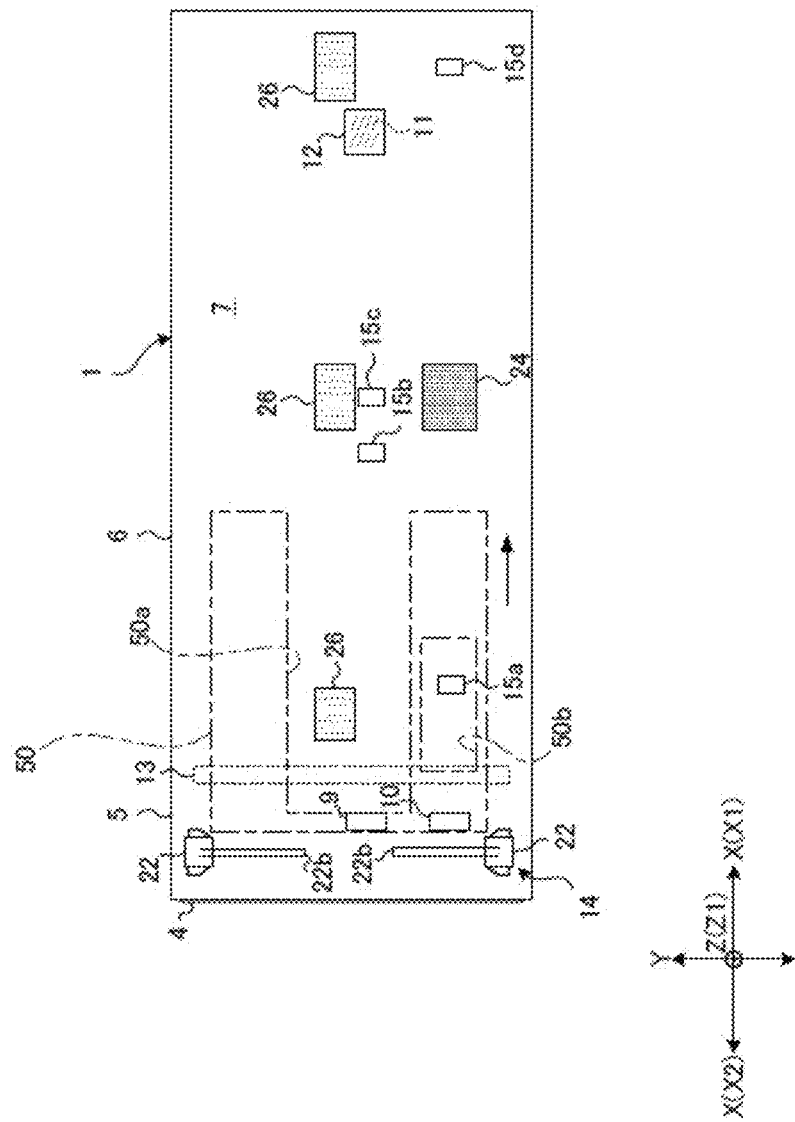
FIG. 9 is a diagram illustrating a state in which the insert skimmer 50 is further pushed to the rear side of the front and rear direction from the state of FIG. 8.

In an example of FIG. 9, the card detection mechanism 15*a* stays at an OFF state at the timing when the card insertion detection mechanism 14 changes to an OFF state. Therefore, the control unit 17 moves the shutter member 13 to the closed position by the shutter driving mechanism 25. In the example of FIG. 9, the shutter member 13 and the insert skimmer 50 overlap. Hence, the shutter member 13 cannot move to the closed position, and contacts the insert skimmer 50 and results in a stopped state. Therefore, in this example, the shutter sensor 25*a* outputs a non-closed state signal.

Figure 10:
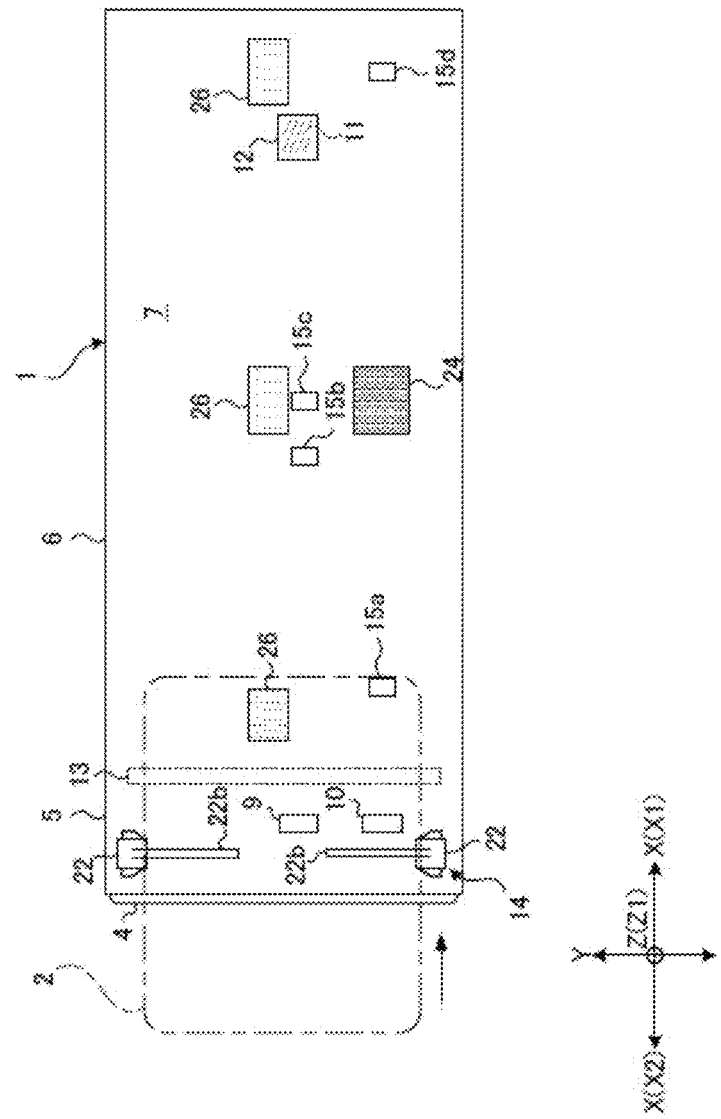
FIG. 10 is a diagram illustrating a state in which a card 2 moves to a card conveyance path 7.

Supposed the case in which the card 2 as an inserted object is inserted to the conveyance path 7 and then pulled out. In this case, the card 2 is pushed to the card conveyance path 7 and then the card detection mechanism 15*a* detects the card 2 (refer to FIG. 10). Then, as shown in FIG. 11, when the card is pulled out, the card insertion detection mechanism 14 changes from an ON state to an OFF state.

Figure 11:
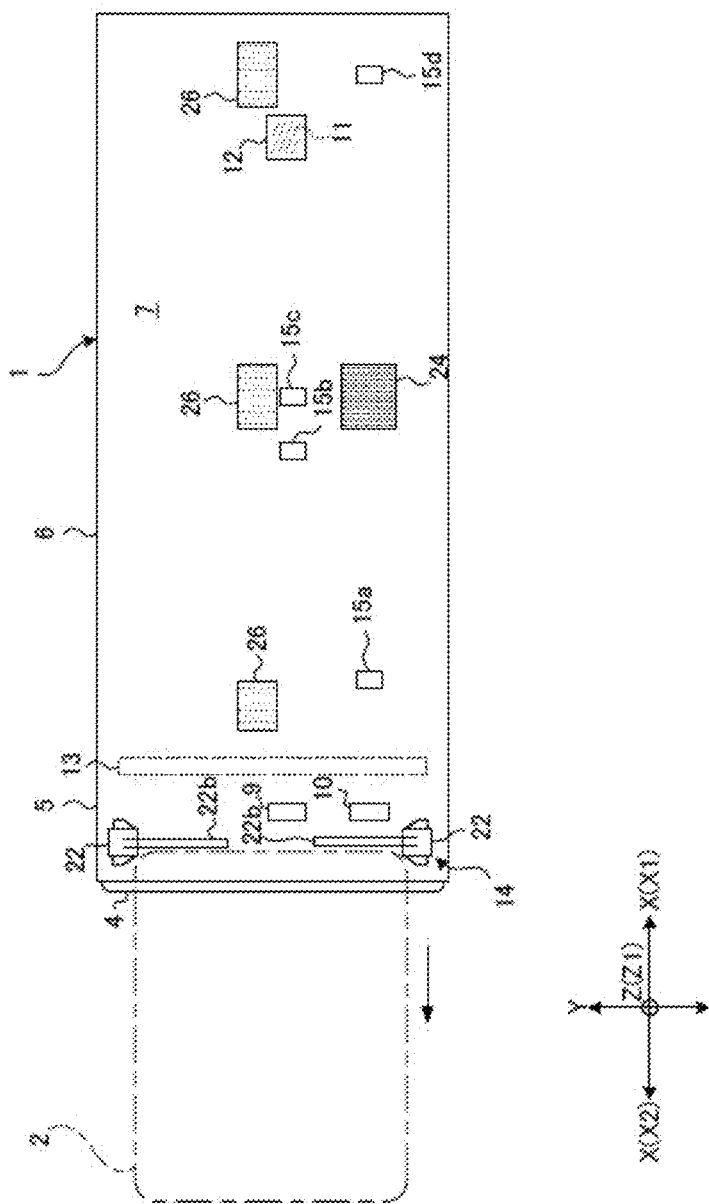
FIG. 11 is a diagram illustrating a state in which the card is pulled out to the front side of the front and rear direction from the state of FIG. 10.

In an example of FIG. 11, the card detection mechanism 15*a* stays at an OFF state at the timing when the card insertion detection mechanism 14 changes to an OFF state. The control unit 17 controls to move the shutter member 13 to the closed position by the shutter driving mechanism 25.

In the example of FIG. 11, the shutter member 13 can move to the closed position. Therefore, in this example, the shutter sensor 25a outputs a non-closed state signal.

Activities of the card insertion detection mechanism 14 and the card detection mechanism 15a when the insert skimmer 50 is inserted to the main body part 6 and activities of the card insertion detection mechanism 14 and the card detection mechanism 15a when the card 2 is inserted to the main body part 6 are matched up.

When the insert skimmer 50 is inserted to the main body part 6, the shutter member 13 tries to move to the closed position at the timing when the card insertion detection mechanism 14 changes to an OFF state, but the shutter member 13 cannot move to the closed position. On the other hand, when the card 2 is inserted to the main body part 6 and pulled out, the shutter member 13 tries to move to the closed position at the timing when the card insertion detection mechanism 14 changes to an OFF state, and the shutter member 13 can move to the closed position. Therefore, when the shutter sensor 25a outputs a non-closed state signal at the above-mentioned timing, the control unit 17 determines that the insert skimmer 50 is inserted and detects that an object other than the card 2 is inserted. When the shutter sensor 25a outputs a non-closed state signal at the above-mentioned timing, the control unit 17 determines that the inserted object is pulled out.

Figure 12:
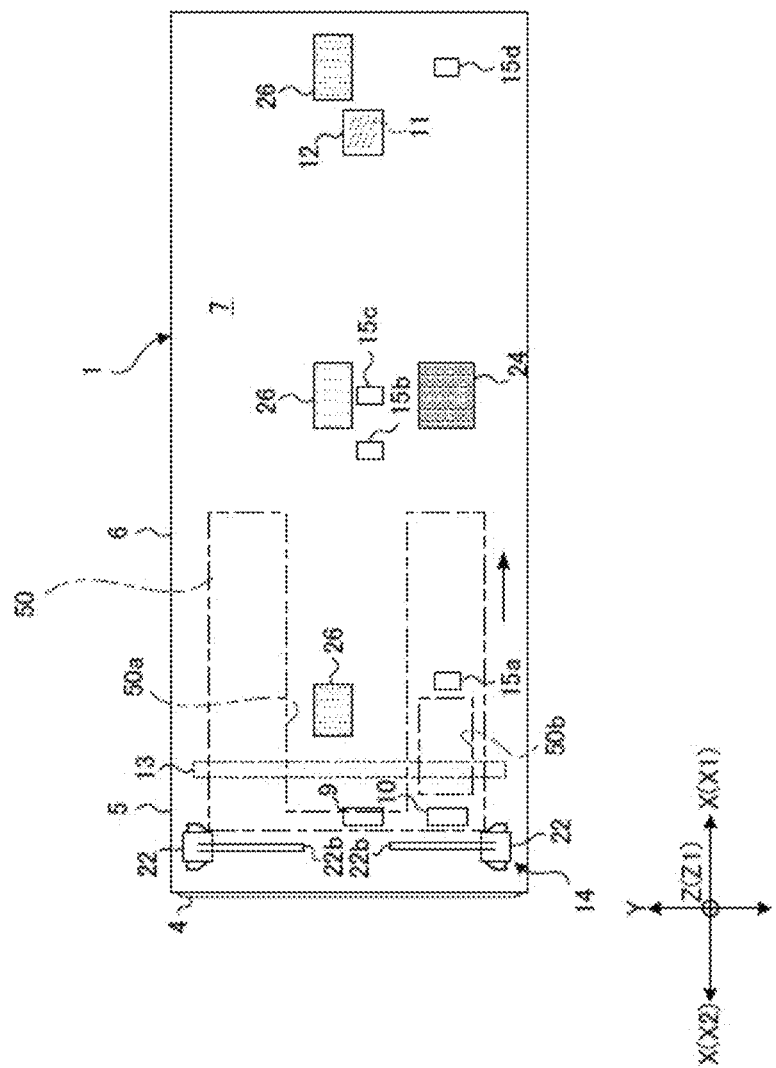
FIG. 12 is a diagram illustrating a state in which the card detection mechanism 15a stays at an ON state at a timing when the card insertion detection mechanism 14 changes to an OFF state after the insert skimmer 50 reaches the card conveyance path 7.

Conceivably, as shown in FIG. 12, depending on the shape of the insert skimmer 50 inserted into the card reader 1, the card insertion detection mechanism 14 changes to an ON state, then the card detection mechanism 15a changes to an ON state, subsequently the card detection mechanism 15a remains at an ON state at the timing when the card insertion detection mechanism 14 changes to an OFF state. In this case, the control unit 17 continues to convey the inserted object (the insert skimmer 50), i.e., the drive of the motor 28, and detects that an object other than the card 2 when the movement distance of the inserted object during a period since this timing until the card detection mechanism 15a does not detect the inserted object is less than a predetermined value.

Figure 13:
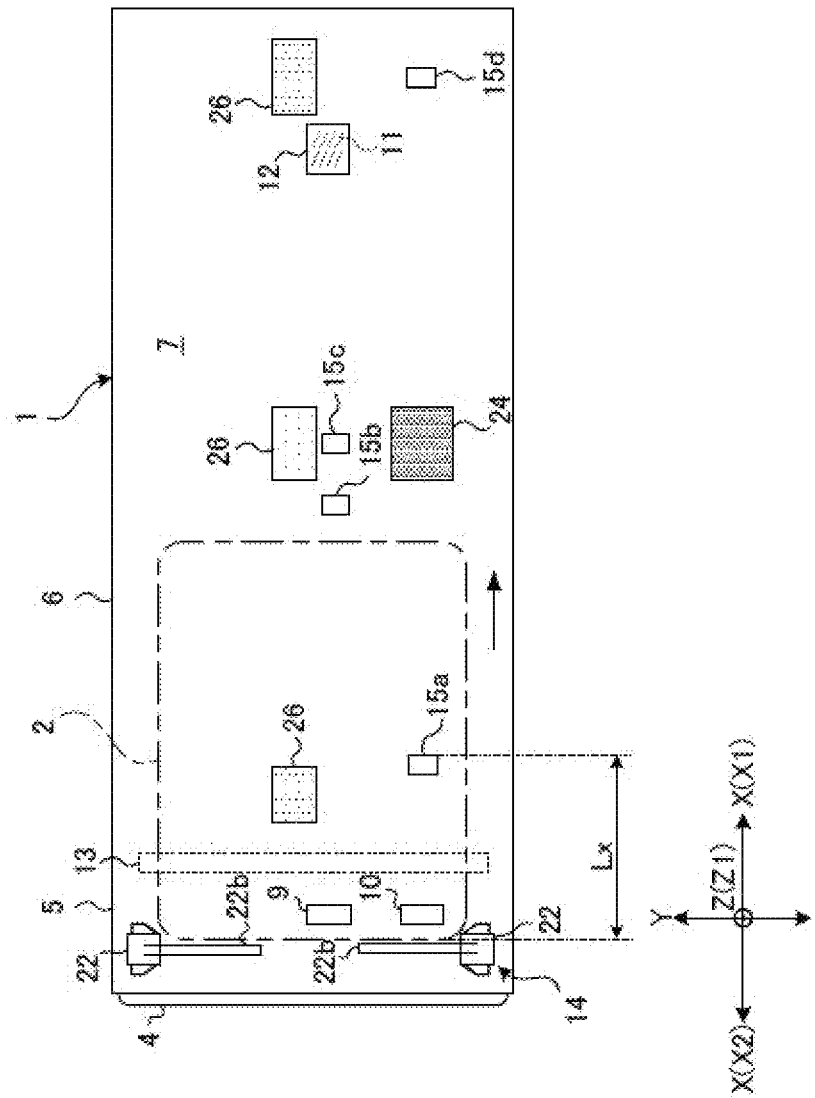
FIG. 13 is a diagram illustrating a state in which the card detection mechanism 15a stays at an ON state at the timing when the card insertion detection mechanism 14 changes to an OFF state after the card 2 reaches the card conveyance path 7.

FIG. 13 is a diagram illustrating a state in which the card 2 is inserted to the card conveyance path 7 and the card insertion detection mechanism 14 changes to an OFF state. When the card 2 is inserted to the card conveyance path 7 and is conveyed normally, the card detection mechanism 15a changes to an OFF state when the card 2 is conveyed a distance Lx between the card detection mechanism 15a and the end of the front side of the card 2 in the front and rear direction, with the state of FIG. 13 as an initial state. On the other hand, when the insert skimmer 50 with a shape shown in FIG. 12 is inserted and pushed to the conveyance path 7, the card detection mechanism 15a changes to an OFF state before the insert skimmer 50 moves the distance Lx, with the state of FIG. 12 as an initial state.

Therefore, in states shown in FIG. 12 or FIG. 13, the control unit 17 continues to convey the inserted object (the card 2 or the insert skimmer 50) and detects that an object other than the card 2 is inserted when the movement distance of the inserted object is less than the distance Lx during a period since the timing of the states until the card detection mechanism 15a does not detect the inserted object. The movement distance of the inserted object during this period, for example, can be determined from an output of an encoder 30 which detects a rotation amount of the motor 28.

Specific Example of Movement of a Card Reader

Figure 14:
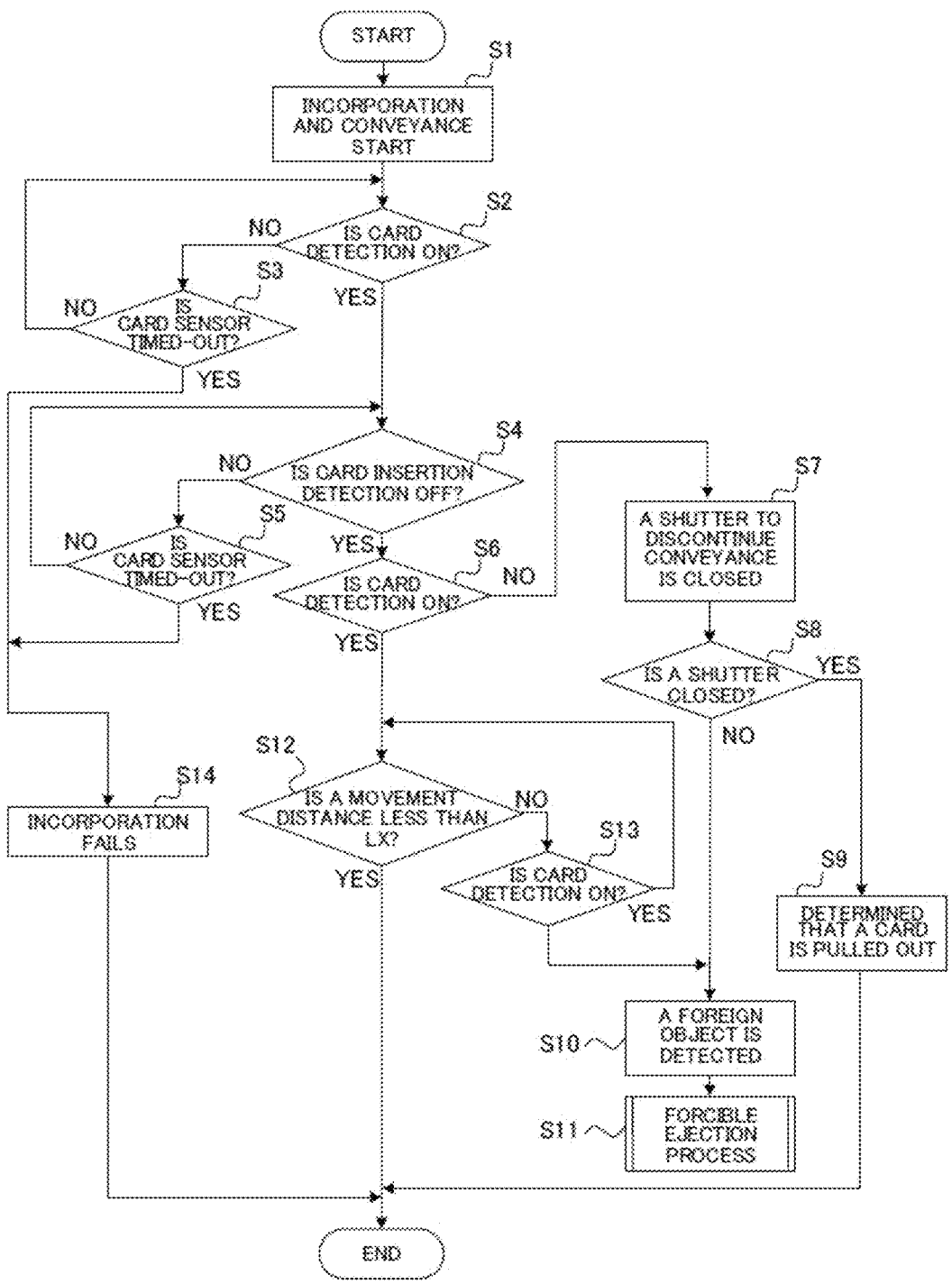
FIG. 14 is a flowchart for describing a movement example of the card reader 1.

FIG. 14 is a flowchart for describing a movement example of the card reader 1. The control unit 17 operates the prehead 10 and the IC chip sensor 9 when the inserted object (the insert skimmer 50 or the card 2) is inserted into the insertion port 4 and the card insertion detection mechanism 14 detects the inserted object. The control unit 17 moves the shutter member 13 move from the closed position to the open position when the prehead 10 succeeds in reading desired information from the tip end of the magnetic stripe of the inserted object and the IC tip sensor 9 detects metal. Subsequently, a conveyance roller 26 starts to drive and starts to incorporate and convey the inserted object (step S1).

Next, the control unit 17 determines a state of the card detection mechanism 15a (step S2), and determines whether or not a state of timeout in which an elapsed time since the conveyance roller 26 starts to incorporate and convey the inserted object in step S1 is a predetermined time is established (step S3) when the card detection mechanism 15a stays at an OFF state (step S2: NO).

The control unit 17 returns a process to step S2 when the state of timeout is not established (step S3: NO). The control unit 17 determines that incorporation of the inserted object fails (step S4) and stops the drive of the conveyance roller 26 to terminate incorporation and conveyance of the inserted object when the state of timeout is established (step S3: YES).

The control unit 17 determines a state of the card insertion detection mechanism 14 (step S4) when the card detection mechanism 15a changes to an ON state as a result of determination in step S2 (step S2: YES). The control unit 17 determines whether the state of timeout is established or not (step S5) when the card insertion detection mechanism 14 stays at an ON state (step S4: NO). The control unit 17 returns the process to step S4 when the state of timeout is not established (step S5: NO) and brings the process to step S14 when the state of timeout is established (step S5: YES).

The control unit 17 determines a state of the card detection mechanism 15a (step S6) when the card insertion detection mechanism 14 stays at an OFF state as a result of determination in step S4 (step S4: YES). The control unit 17 stops the drive of the conveyance roller 26 and moves the shutter member 13 to the closed position (step S7) when the card detection mechanism 15a stays at an OFF state (step S6: NO, equivalent to the states illustrated in FIG. 9 or FIG. 11). Then, the control unit 17 determines whether the shutter member 13 has moved to the closed position based on a signal from the shutter sensor 25a (step S8).

The control unit 17 determines that the inserted object is pulled out (step S9) when determining that the shutter member 13 has moved to the closed position (step S8: YES), and stops the drive of the conveyance 26 to terminate incorporation of the inserted object.

The control unit 17 determines that the inserted object is the insert skimmer 50 and detects that an object other than the card 2 is inserted (step S10) when determining that the shutter member 13 has not moved to the closed position (step S8: NO). Then, the control unit 17 performs a forced ejection process to eject the inserted object forcibly from the card conveyance path 7 (step S11).

The control unit 17 continues to convey the inserted object and determines whether a movement distance of the inserted object reaches the above-mentioned distance Lx or not (step S12) when the card detection mechanism 15a stays at an ON state as a result of determination in step S6 (step S6: YES, equivalent to the states illustrated in FIG. 12 or FIG. 13).

The control unit 17 determines a state of the card detection mechanism 15a (step S13) when the movement distance of the inserted object is less than the distance Lx (step S12:

NO). The control unit 17 retunes the process to step S12 when the card detection mechanism 15a stays at an ON state (step S13: YES). The control unit 17 brings the process to step S10 when the card detection mechanism 15a stays at an OFF state (step S13: NO, equivalent to the state in which the insert skimmer 50 moves from the state of FIG. 12 further and deeper to the rear side of the conveyance path 7).

The control unit 17 conveys the inserted object further to the rear side of the conveyance path 7 and ejects the inserted object after reading information of the inserted object when the movement distance of the inserted object reaches the distance Lx as a result of determination in step S12.

Specific Example of Forced Ejection Process

Figure 15:
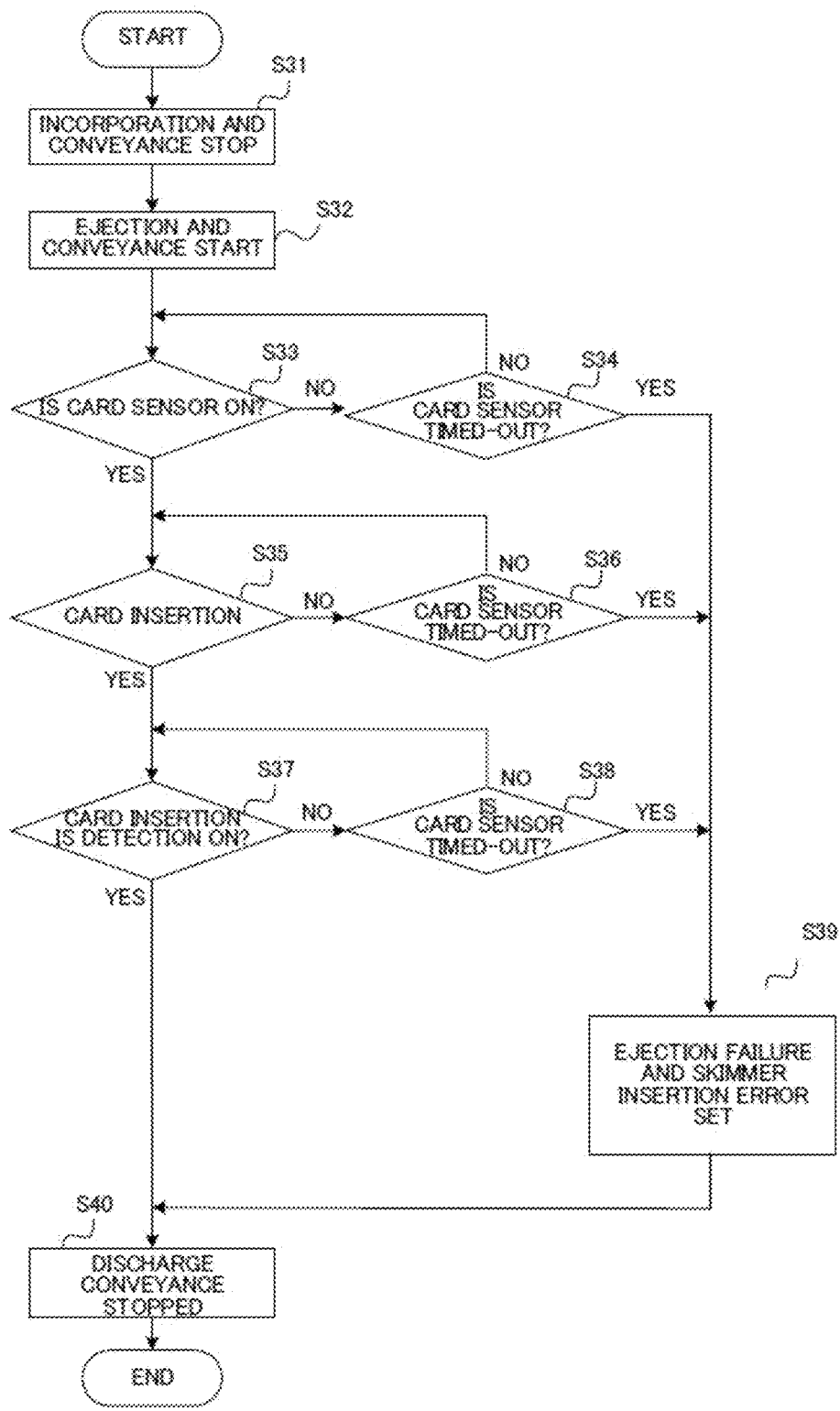
FIG. 15 is a flowchart for describing a forced ejection process of Step 11 described in FIG. 14.

FIG. 15 is a flowchart for describing the forced ejection process of Step S11 shown in FIG. 14. First, the control unit 17 stops the conveyance by the conveyance rollers 26 to the rear side in the front and rear direction of the insert (Step S31), and rotates the conveyance rollers 26 in reverse to start the ejection and conveyance for conveying the insert to the front side of the front and rear direction (Step S32).

After Step S32, the control unit 17 determines whether or not the card detection mechanism 15a is in the ON state (Step S33), and when the card detection mechanism 15a is in the OFF state (Step S33: NO), determines whether or not the elapsed time from the start of the process in step S32 is in a timed-out state which is a predetermined time (Step S34).

When the control unit 17 is not timed out (Step S34: NO), the process returns to Step S33. When the control unit 17 is timed-out (Step S34: YES), the error information indicating that the insert skimmer 50 is inserted is recorded in the ROM in Step S39. After Step S39, the control unit 17 stops the driving of the conveyance roller 26 (Step S40).

When the process of Step S39 is performed, the control unit 17 returns an error to the request from the host device 3, and the incorporation operation of the card 2 is not performed until the error information recorded in the ROM is deleted. When the control unit 17 receives an error release request from the host device 3, the control unit 17 deletes the error information recorded in the ROM, and returns to a normal operation mode.

When the card detection mechanism 15a in Step S33 is determined to be in the ON state (Step S33: YES), the control unit 17 determines whether or not the card detection mechanism 15a is in the OFF state (Step S35), and when the ON state continues (Step S35: NO), determines whether or not the card detection mechanism 15a is in a timed-out state (Step S36). When the control unit 17 is not timed out (Step S36: NO), the process returns to Step S35, and when it is timed-out (Step S36: YES), the process of Step S39 is performed.

When it is determined that the card detection mechanism 15a is in the OFF state in Step S35 (Step S35: YES), the control unit 17 determines whether or not the card insertion detection mechanism 14 is in an ON state (Step S37), and when the card insertion detection mechanism 14 is in an OFF state (Step S37: NO), determines whether or not it is in a timed-out state (Step S38). The control unit 17 returns the process to Step S37 when it is not timed out (Step S38: NO), and performs the process of Step S39 when it is timed-out (Step S38: YES).

When it is determined in Step S37 that the card insertion detection mechanism 14 is in an ON state (Step S37: YES), the control unit 17 stops the driving of the conveyance roller 26 in Step S40. When the insert skimmer 50 is the one shown in FIG. 5B, the determination of Step S37 is YES, and is a state in which this insert skimmer 50 is forcibly ejected. When the insert skimmer 50 is the one shown in FIG. 5A, the determination of one of Step S34 to Step S38 is YES, and is a state in which this insert skimmer 50 is accommodated inside the main body part 6.

Effect of the Card Reader of the Embodiment

The card reader 1 can discriminate between the state in which the insert skimmer 50 is inserted as shown in FIG. 9 and the state in which the card 2 is pulled out after being inserted as shown in FIG. 11, and thus, can detect the insertion of the insert skimmer 50 with a high accuracy. The crime prevention effect can improve thereby.

As shown in FIG. 12, the card reader 1 can detect that the insert skimmer 50 is inserted even when the insert skimmer 50 shaped to maintain the card detection mechanism 15a at an ON state at the timing when the card insertion detection mechanism 14 changes to an OFF state is inserted. Thus, the crime prevention effect against different-shaped insert skimmers can be achieved.

Modified Example of the Card Reader of the Embodiment

The control unit 17 may detect that an object other than the card 2 is inserted when the card insertion detection mechanism 14 detects the object inserted from the insertion port 4, the card detection mechanism 15a detects the inserted object, the card insertion detection mechanism 14 continues to detect the inserted object, and the card detection mechanism 15a does not detect the inserted object.

Supposed that a length of the main body part of the insert skimmer 50 in the front and rear direction is longer than that of the card 2, for example. In this case, the card detection mechanism 15 may change to an OFF state before the card insertion detection mechanism 14 detects that the insert skimmer 50 is inserted from the insertion port 4, the card detection mechanism 15a detects the tip end of the insert skimmer 50, and the card insertion detection mechanism 14 changes to an OFF state. The card detection mechanism 15a does not change to an OFF state before the card insertion detection mechanism 14 changes to an OFF state when the card 2 is inserted. Therefore, together with the above-mentioned detection process, accuracy for detecting a foreign object can be enhanced.

As described above, this specification discloses the following content.

(1)

A card reader comprising:
  a main body part including a card conveyance path in which a card inserted from an insertion port is conveyed;
  a first card detection mechanism disposed upstream of the main body part in an insertion direction of the card and structured to detect the card;
  a second card detection mechanism disposed in the main body part at a distance less than a length of the card in the insertion direction from the first card detection mechanism and structured to detect the card;
  a shutter member disposed between the first card detection mechanism and the second card detection mechanism and structured to move between a closed position to close the card conveyance path and an open position to open the card conveyance path;

a shutter state detector structured to detect a state of the shutter member; and a control unit structured to:
control to move the shutter member to the closed position when an object inserted from the insertion port is detected by the second card detection mechanism after the inserted object is detected by the first card detection mechanism, and then the inserted object is not detected by the second card detection mechanism at a timing when the inserted object is not detected by the first card detection mechanism; and detect that an object other than the card has been inserted when the shutter state detector detects that the shutter member does not move to the closed position after the control.

In the card reader according to (1), the insert skimmer comprising a through-hole to escape the second card detection mechanism is inserted from the insertion port, the first card detection mechanism detects the insert skimmer, the second card detection mechanism detects the insert skimmer, and then the first card detection mechanism does not detect the insert skimmer.

At this timing, the second card detection mechanism does not detect the insert skimmer when the through hole stays at a position to escape the second card detection mechanism. The shutter member contacts the insert skimmer and cannot move to the closed position conceivably because the shutter member is controlled to move to the closed position but the shutter member and the insert skimmer overlap at the timing when the first card detection mechanism changes to an OFF state. On the other hand, supposed the case that the card is inserted and pulled out, the first card detection mechanism detects the card and the second card detection mechanism detects the card. Then, the second card detection mechanism does not detect the card at the timing when the first card detection mechanism does not detect the card if the card is pulled out. At this time, the shutter member does not contact the card and the shutter member moves to the closed position because the shutter member is controlled to stay at the closed position but the card is pulled out. Therefore, the card detection mechanisms can detect that the insert skimmer is inserted when the shutter member does not stay at the closed position after the control. Accurate detection of a foreign object can thereby be completed.

(2)
The card reader according to (1), wherein
the control unit determines that the card has been pulled out when the shutter state detector detects that the shutter member moves to the closed position after the control.

According to (2), the control unit can conduct necessary processes, for example, the control unit promotes discontinuance of conveyance and reinsertion because the control unit can detect that the card is pulled out.

(3)
The card reader according to (1) or (2), wherein
the control unit continues to convey the inserted object when the inserted object is detected by the second card detection mechanism at the timing, and detects that an object other than the card has been inserted when a movement distance of the inserted object in a period from the timing until the inserted object is not detected by the second card detection mechanism is less than a predetermined value.

In the card reader according to (3), conceivably, depending on a shape of the insert skimmer, the second card detection mechanism may detect the inserted object at the timing like when the card is inserted normally. Even in this case, the second card detection mechanism does not detect the inserted object at a timing before the card is conveyed when the inserted object is the insert skimmer. Therefore, the card detection mechanisms can detect that the insert skimmer is inserted when a movement distance of the inserted object is less than a predetermined value as a conveyance distance of a legitimate card. Anti-crime capacity can be further enhanced.

(5)
The card reader according to any one of (1) to (3), wherein
the control unit detects that an object other than the card has been inserted when the object inserted from the insertion port is detected by the second card detection mechanism after the inserted object is detected by the first card detection mechanism, and then the inserted object is not detected by the second card detection mechanism in a state in which the inserted object is detected by the first card detection mechanism.

According to (4), the control unit can detect that an insert skimmer wide in an insertion direction is inserted.

A foreign matter detection method for a card reader comprising a main body part including a card conveyance path in which a card inserted from an insertion port is conveyed, a first card detection mechanism disposed upstream of the main body part in an insertion direction of the card and structured to detect the card, a second card detection mechanism disposed in the main body part at a distance less than a length of the card in the insertion direction from the first card detection mechanism and structured to detect the card, and a shutter member disposed between the first card detection mechanism and the second card detection mechanism and structured to move between a closed position to close the card conveyance path and an open position to open the card conveyance path, the foreign matter detection method comprising:
controlling to move the shutter member to the closed position when an object inserted from the insertion port is detected by the second card detection mechanism after the inserted object is detected by the first card detection mechanism, and then the inserted object is not detected by the second card detection mechanism at a timing when the inserted object is not detected by the first card detection mechanism; and detecting that an object other than the card has been inserted when it is detected that the shutter member does not move to the closed position after the control.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card, the card reader comprising:
a main body part comprising a card conveyance path in which the card inserted from an insertion port is conveyed;

a first card detection mechanism disposed upstream of the main body part in an insertion direction of the card and structured to detect the card;

a second card detection mechanism disposed in the main body part at a distance less than a length of the card in the insertion direction from the first card detection mechanism and structured to detect the card;

a shutter member disposed between the first card detection mechanism and the second card detection mechanism and structured to move between a closed position to close the card conveyance path and an open position to open the card conveyance path;

a shutter state detector structured to detect a state of the shutter member; and a control unit structured to:
control the shutter member to move to the closed position when an object inserted from the insertion port is detected by the second card detection mechanism after the inserted object is detected by the first card detection mechanism, and then the inserted object is not detected by the second card detection mechanism at a timing when the inserted object is not detected by the first card detection mechanism; and detect that an object other than the card has been inserted when the shutter state detector detects that the shutter member does not move to the closed position after the control.

2. The card reader according to claim 1, wherein the control unit is structured to determine that the card has been pulled out when the shutter state detector detects that the shutter member moves to the closed position after the control.

3. The card reader according to claim 2, wherein the control unit is structured to continue conveying the inserted object when the inserted object is detected by the second card detection mechanism at the timing, and detect that an object other than the card has been inserted when a movement distance of the inserted object in a period from the timing until the inserted object is not detected by the second card detection mechanism is less than a predetermined value.

4. The card reader according to claim 3, wherein the control unit is structured to detect that an object other than the card has been inserted when the object inserted from the insertion port is detected by the second card detection mechanism after the inserted object is detected by the first card detection mechanism, and then the inserted object is not detected by the second card detection mechanism in a state in which the inserted object is detected by the first card detection mechanism.

5. The card reader according to claim 2, wherein the control unit is structured to detect that an object other than the card has been inserted when the object inserted from the insertion port is detected by the second card detection mechanism after the inserted object is detected by the first card detection mechanism, and then the inserted object is not detected by the second card detection mechanism in a state in which the inserted object is detected by the first card detection mechanism.

6. The card reader according to claim 1, wherein the control unit is structured to continue conveying the inserted object when the inserted object is detected by the second card detection mechanism at the timing, and detect that an object other than the card has been inserted when a movement distance of the inserted object in a period from the timing until the inserted object is not detected by the second card detection mechanism is less than a predetermined value.

7. The card reader according to claim 6, wherein the control unit is structured to detect that an object other than the card has been inserted when the object inserted from the insertion port is detected by the second card detection mechanism after the inserted object is detected by the first card detection mechanism, and then the inserted object is not detected by the second card detection mechanism in a state in which the inserted object is detected by the first card detection mechanism.

8. The card reader according to claim 1, wherein the control unit is structured to detect that an object other than the card has been inserted when the object inserted from the insertion port is detected by the second card detection mechanism after the inserted object is detected by the first card detection mechanism, and then the inserted object is not detected by the second card detection mechanism in a state in which the inserted object is detected by the first card detection mechanism.

9. A foreign matter detection method for a card reader comprising a main body part including a card conveyance path in which a card inserted from an insertion port is conveyed, a first card detection mechanism disposed upstream of the main body part in an insertion direction of the card and structured to detect the card, a second card detection mechanism disposed in the main body part at a distance less than a length of the card in the insertion direction from the first card detection mechanism and structured to detect the card, and a shutter member disposed between the first card detection mechanism and the second card detection mechanism and structured to move between a closed position to close the card conveyance path and an open position to open the card conveyance path, the foreign matter detection method comprising:
controlling the shutter member to move to the closed position when an object inserted from the insertion port is detected by the second card detection mechanism after the inserted object is detected by the first card detection mechanism, and then the inserted object is not detected by the second card detection mechanism at a timing when the inserted object is not detected by the first card detection mechanism; and detecting that an object other than the card has been inserted when it is detected that the shutter member does not move to the closed position after the control.

\* \* \* \* \*